United States Patent [19]

Preston

[11] 4,005,989
[45] Feb. 1, 1977

[54] COATED SUPERALLOY ARTICLE

[75] Inventor: Noel Butters Preston, Somers, Conn.

[73] Assignee: United Technologies Corporation, Hartford, Conn.

[22] Filed: Jan. 13, 1976

[21] Appl. No.: 648,853

[52] U.S. Cl. .................................. 29/194; 75/171; 427/405

[51] Int. Cl.$^2$ ....................................... B32B 15/20

[58] Field of Search ....................... 29/194; 75/171; 427/405

[56] References Cited

UNITED STATES PATENTS

| | | | |
|---|---|---|---|
| 3,542,530 | 11/1970 | Talboom et al. | 29/194 X |
| 3,649,225 | 3/1972 | Simmons | 29/194 |
| 3,676,085 | 7/1972 | Evans et al. | 29/194 |
| 3,754,903 | 8/1973 | Goward et al. | 75/171 |
| 3,869,779 | 3/1975 | Gedwill et al. | 29/194 |

*Primary Examiner*—L. Dewayne Rutledge
*Assistant Examiner*—E. L. Weise
*Attorney, Agent, or Firm*—Richard N. James

[57] ABSTRACT

A protective coating is provided on gas turbine engine type superalloys comprising an interlayer adjacent the superalloy substrate a principal protective element of which comprises an aluminide of the basis metal of the substrate formed by the reaction of aluminum at high temperature with the substrate, and an overlayer comprising an MCrAlY-type coating where M is selected from the group consisting of cobalt, nickel and iron.

9 Claims, No Drawings

COATED SUPERALLOY ARTICLE

BACKGROUND OF THE INVENTION

The present invention falls generally within the coating arts and relates, more particularly, to components having high temperature oxidation resistant coatings thereon which provide protection in severe environments such as those associated with advanced gas turbine engines.

Coatings of the MCrAlY-type are now well known in the art, as evidenced by the U.S. Patents to Evans et al. U.S. Pat. No. 3,676,085; Goward et al. U.S. Pat. No. 3,754,903; and Talboom, Jr. et al. U.S. Pat. No. 3,542,530; all of which share a common assignee with the present invention. Typically, the MCrAlY coatings are characterized by high chromium and aluminum contents and contain yttrium in a basis metal comprising one or more of the elements selected from the group consisting of cobalt, nickel and iron. They are usually characterized as overlay coatings denoting the fact that they are deposited as the MCrAlY alloy on the surface to be protected and, thus, act substantially independent of the substrate in the performance of their protective function.

Aluminide coatings and processes for producing such coatings are also known and have been used for a number of years as the principal coating technique for gas turbine engine elements. In the U.S. Patent to Joseph U.S. Pat. No. 3,102,044, which also shares a common assignee with the present invention, aluminum rich slurry applied to a superalloy surface is reacted therewith to form a protective aluminide or aluminides. U.S. Pat. No. 3,257,230 describes another aluminizing technique, i.e. the formation of a protective aluminide on alloy surfaces by a pack cementation process.

Prior to the introduction of the MCrAlY-type coatings the superalloys were, as previously mentioned, typically protected through the formation of an aluminide directly on and by reaction with the superalloy surface by exposure of that surface at high temperature to aluminum or aluminum containing vapors. The principal aluminide formed was usually that of the basis metal of the substrate, i.e. nickel, cobalt or iron. However in addition to the principal aluminide the coating layer often included amounts of other ingredients present in the substrate alloy and, in most instances, the total coating comprised a composition which while acceptable nevertheless represented a compromise in terms of composition and something less than would be desired if the coating were to be optimized.

As engine environments and other demands on the coated aluminum increased in severity, the widely used aluminide found less acceptability in some circumstances and it became advisable to pursue further coating improvements. Coatings, of course, play a major role in engine design acceptability. The MCrAlY-type coatings were the result of such coating improvement studies and permitted the engine designer greater flexibility in his constructions in connection with the development of advanced gas turbine engines.

With the introduction of the MCrAlY coatings it was possible to preserve or increase coating and coated component lifetimes in more severe engine environments associated with the advanced engines. As previously mentioned, the MCrAlY coatings are generally deposited on the substrate surface as the MCrAlY alloy usually by vacuum vapor deposition, sputtering or plasma spray techniques. The basic protection is provided by the deposited alloy itself which may be more closely optimized for such protection since it is substantially independent of the substrate itself. There is, of course, a desirable and limited interaction of the coating with the substrate metal but this is in the nature of metallurgical bonding rather than a reaction per se, and the protective elements are derived from the MCrAlY alloy rather than from the substrate.

In later developments it was suggested that additional coating improvements were achievable through the use of multiple coating layers or composite coatings. In the U.S. Patent to Simmons U.S. Pat. No. 3,649,225 of the present assignee, for example, the use of a composite coating comprising a chromium or chromium rich interlayer adjacent a superalloy substrate with an MCrAlY layer thereover is described.

Several other developments relating to MCrAlY-type coatings have even more recently been published in the patent literature. In U.s. Pat. No. 3,849,865 a substrate to be protected is first clad with a metallic foil, such as NiCrAlSi or FeCrAlY and then that foil is covered with an aluminide layer. U.S. Pat. Nos. 3,873,347 and 3,874,901 both appear to describe somewhat similar systems, referring to coating techniques where a superalloy body is first coated with an MCrAlY-type layer which is then aluminized to provide an overlayer of aluminum or an aluminide.

SUMMARY OF THE INVENTION

The present invention contemplates a coated article comprising a superalloy substrate having an aluminide coating composed primarily of the aluminide of the basis metal with an overcoat comprising an MCrAlY-type alloy.

Preferred embodiments of the present invention have displayed the potential of lifetimes more than three times greater than those of articles without the aluminide or without the aluminide as an interlayer.

DESCRIPTION OF THE PREFERRED EMBODIMENTS

The superalloys are generally those alloys characterized as nickel, cobalt or iron base alloys which display high strengths at high temperatures. There are a number of the superalloys which are used in gas turbine engines. Of these, the greatest physical demands are usually placed on those employed in blades and vanes in such engines since the blades and vanes face the highest stress at the highest temperatures. Additionally, blades and vanes are particularly subject to the problems associated with thermal shock, differential thermal growth, fatigue, errosion, etc.

Representative of the blade and vane alloys are the following nickel-base superalloys:

a. IN-100 having a nominal composition comprising 10 percent chromium, 15 percent cobalt, 4.5 percent titanium, 5.5 percent aluminum, 3 percent molybdenum, 0.17 percent carbon, 1 percent vanadium, 0.06 percent boron, 0.05 percent zirconium, balance nickel.

b. MAR-M200 at a composition comprising 9 percent chromium, 10 percent cobalt, 2 percent titanium, 5 percent aluminum, 12.5 percent tungsten, 0.15 percent carbon, 1 percent columbium, 0.015 percent boron, 0.05 percent zirconium, balance nickel.

c. INCONEL 792 at a nominal composition of 13 percent chromium, 10 percent cobalt, 4.5 percent titanium, 3 percent aluminum, 2 percent molybdenum, 4 percent tantalum, 4 percent tungsten, 0.2 percent carbon, 0.02 percent boron, 0.1 percent zirconium, balance nickel.

Representative cobalt-base alloys used in gas turbine engines include the following:

a. WI-52 which comprises 21 percent chromium, 11 percent tungsten, 2 percent columbium plus tantalum, 1.75 percent iron, 0.45 percent carbon, balance cobalt.

b. MAR-M509 which has a nominal composition comprising 21.5 percent chromium, 10 percent nickel, 7 percent tungsten, 3.5 percent tantalum, 0.2 percent titanium, 0.6 percent carbon, 0.5 percent zirconium, balance cobalt.

In the practice of the present invention the superalloy substrate is first provided with an aluminide coating. This coating may be accomplished by slurry, pack cementation, sputtering or any of the other techniques known in the art for this purpose. Many of the advanced blades and vanes to which the invention has particular application are provided with internal cooling passages for which surface protection is suitably provided in addition to that required on the external airfoil surfaces. When both internal and external surfaces are to be aluminized, the most preferred processes are the pack cementation or gas phase techniques.

In one aluminizing method, the parts to be coated, after thorough cleaning, were embedded in a dry powder mix containing about 15 weight percent of an aluminum/12 percent silicon alloy, up to about 2.5 percent ammonium chloride, with the balance alumina. The embedded parts were then heated to a temperature of about 1400° F. and held at that time for a period sufficient to produce the desired coating thickness. Coating of external surfaces, blade roots, shroud platforms and internal passages has typically been performed in one operation. Of course, areas where coating is not desired will have been appropriately masked during the aluminizing operation.

Generally an aluminide coating thickness, including diffused zone, of 0.001–0.0025 inch has been used for all surfaces, but obviously more or less may be acceptable or even advisable in other circumstances. Usually also the aluminum content at the surface of the aluminide has been established at about 22–36 weight percent, but variations are also possible here.

There are two principal considerations in the determination of optimum aluminide coating thickness and aluminum content. The degree of protection provided is dependent to a great extent upon the amount of aluminum available in the coating. Perhaps more importantly, however, is the necessity for providing in the aluminide a firm base for the MCrAlY overcoat, an element of which requires reasonable ductility particularly in circumstances where thermal shock conditions may exist.

Parts have also been aluminized by a higher temperature pack cementation process, wherein embedded nickel-base alloy parts are heated in a pack at a temperature up to 1900° F. in a hydrogen or argon atmosphere.

Subsequent to the aluminizing operation, an MCrAlY coating is deposited thereover. A particularly preferred NiCoCrAlY coating at a composition of about, by weight, comprising 14–22 percent chromium, 11.5–13.5 percent aluminum, 0.1–0.5 percent yttrium, 20–26 percent cobalt, balance nickel has been used.

This coating has typically been applied by vacuum vapor deposition techniques, although sputtering and plasma spray processes have also been used to apply MCrAlY coatings.

Another MCrAlY coating is the CoCrAlY alloy at a composition by weight of about 15–21 percent chromium, 10–12 percent aluminum, 0.3–0.9 percent yttrium, balance cobalt.

The preferred processing involves vapor deposition from a molten pool of coating material in a vacuum chamber ($10^{-4}$ Torr or better) onto a preheated part, with deposition continuing until the desired thickness, typically 0.001–0.005 inch is achieved.

Following deposition, the coated article is generally dry glass bead peened. Subsequently, the coated article is subjected to a diffusion heat treatment at a temperature selected to accommodate not only the particular coating involved but also the substrate. Typically for the blade and vane alloys a heat treatment of 1975° F. for about 4 hours has been found appropriate.

Testing of the coated articles, has revealed some surprising results.

In cyclic oxidation:

a. a nickel-base superalloy specimen coated with the NiCoCrAlY coating alone lasted 953 hours; to the onset of pitting;

b. a nickel-base superalloy specimen coated with the NiCoCrAlY coating with an aluminide overcoat survived 890 hours to the onset of pitting;

c. a specimen according to the present invention comprising a nickel-base superalloy having an aluminide interlayer and a NiCoCrAlY overcoat is currently still in test at 3177 hours with no sign of pitting to this time.

This represents a factor of greater than three for this embodiment of the present invention.

In another cyclic oxidation test:

a. a specimen having a CoCrAlY undercoat and an aluminide overcoat exhibited pitting at 163 hours;

b. a specimen according to the present invention having an aluminide interlayer and a CoCrAlY overcoat revealed a time to pitting of 274 hours.

The substantial and unexpected superiority of the present invention was thus conclusively demonstrated.

Although the present invention has been described in connection with certain examples and preferred embodiments, these are illustrative only. Improvements to and modification thereof may be made thereto in the true spirit and within the scope of the invention.

I claim:

1. A coated article comprising:
   a superalloy substrate,
   a first coating thereon consisting essentially of an aluminide of the basis metal of the substrate, and
   an MCrAlY coating thereover,
   where M is selected from the group consisting of nickel, cobalt, and iron.

2. A coated article comprising:
   a superalloy substrate the basis metal of which is an element selected from the group consisting of nickel, cobalt or iron,
   a first protective coating thereon the principal protective element of which consists essentially of a ductile aluminide of the basis metal; and
   an MCrAlY overlay coating over the first coating, where M is selected from the group consisting of nickel, cobalt and iron.

3. A coated article according to claim 2 wherein:

the MCrAlY coating has a composition which consists essentially of, by weight, 15–35 percent chromium, 10–20 percent aluminum, 0.01–3 percent yttrium, balance selected from the group consisting of nickel, cobalt and iron.

4. A coated gas turbine engine component which comprises:
- a nickel-base superalloy substrate,
- a ductile nickel aluminide coating formed at the substrate surface, and
- a NiCoCrAlY coating over the aluminide coating.

5. A coated component according to claim 4 wherein:
the NiCoCrAlY coating has a composition consisting essentially of, by weight, 11–48 percent cobalt, at least 15 percent nickel, 10–40 percent chromium, 9–15 percent aluminum, and 0.01–1 percent yttrium.

6. A coated component according to claim 5 wherein:
the NiCoCrAlY coating has a composition consisting essentially of, by weight, 25–40 percent cobalt, 14–22 percent chromium, 10–13 percent aluminum, 0.01–1 percent yttrium, balance essentially nickel.

7. A coated gas turbine engine component which comprises:
- a nickel-base superalloy substrate,
- a ductile nickel aluminide layer on the substrate surface, and
- a CoCrAlY coating over the aluminide layer.

8. A coated component according to claim 7 wherein:
the CoCrAlY coating has a composition which consists essentially of, by weight, 15–40 percent chromium, 10–25 percent aluminum, 0.01–5 percent yttrium, balance cobalt.

9. A coated component according to claim 8 wherein:
the CoCrAlY coating has a composition which consists essentially of, by weight, 15–25 percent chromium, 11–14 percent aluminum, 0.1–1 percent yttrium, balance cobalt.

* * * * *